(12) United States Patent
Timoney et al.

(10) Patent No.: US 6,824,488 B2
(45) Date of Patent: Nov. 30, 2004

(54) VEHICLE DRIVELINE

(75) Inventors: Eanna Pronsias Timoney, Navan (IE); Anthony Ryalls, Heanor (GB)

(73) Assignee: Technology Investments Limited, Navan (IE)

( * ) Notice: Subject to any disclaimer, the term of this patent is extended or adjusted under 35 U.S.C. 154(b) by 87 days.

(21) Appl. No.: 10/071,078

(22) Filed: Feb. 11, 2002

(65) Prior Publication Data

US 2002/0108793 A1 Aug. 15, 2002

(30) Foreign Application Priority Data

Feb. 9, 2001 (IE) .......................................... S2001/0127

(51) Int. Cl.⁷ ............................................... H16H 48/06
(52) U.S. Cl. ................................... 475/221; 180/24.09
(58) Field of Search ...................... 180/24.09; 475/221, 475/222

(56) References Cited

U.S. PATENT DOCUMENTS

| | | | | |
|---|---|---|---|---|
| 2,395,108 A | * | 2/1946 | Donley et al. | 180/24.09 |
| 3,976,154 A | * | 8/1976 | Clark et al. | 180/24.05 |
| 4,050,534 A | * | 9/1977 | Nelson et al. | 180/24.09 |
| 4,823,897 A | * | 4/1989 | Wohlfarth | 180/75.1 |
| 4,914,979 A | * | 4/1990 | Balmforth | 475/221 |
| 5,860,889 A | * | 1/1999 | Schlosser et al. | 475/221 |

* cited by examiner

*Primary Examiner*—Dirk Wright
(74) *Attorney, Agent, or Firm*—Birch, Stewart, Kolasch & Birch, LLP

(57) ABSTRACT

A vehicle driveline for a multi-axle vehicle includes a through drive axle unit; which is a close-coupled assembly comprising a torque transfer mechanism with an associated differential unit and an axle differential unit. An output shaft of the through drive unit is on substantially the same axis an input pinion to the axle differential unit.

10 Claims, 2 Drawing Sheets

VEHICLE DRIVELINE

BACKGROUND OF THE INVENTION

1. Field of the Invention

The invention relates to a driveline for a multi-axle vehicle.

2. Description of Related Art

The invention is suitable for use in 6×6, 8×8, and 10×10 vehicle drive lines. For example, an 8×8 vehicle has four driven axles, each incorporating a differential unit that in turn drives two wheel sets, one at each side of the vehicle. It is known in practice to distribute the drive power from the engine through the main transmission gearbox via a propeller shaft to a central torque transfer case incorporating a differential unit that splits the drive between the front and the rear of the vehicle. From the central torque transfer case, a first output drive goes via a propeller shaft towards the front of the vehicle to a front torque transfer case incorporating a differential unit that splits the drive between the first and the second axle of the vehicle. Also, from the central torque transfer case, a second output drive goes via propeller shaft towards the rear of the vehicle to a rear torque transfer case incorporating a differential unit that splits the drive between the third and fourth axle of the vehicle.

In known applications, these three torque transfer cases with their associated differential units take up room that would otherwise be available for useful cargo or equipment. It is known practice to integrate the front and rear torque transfer cases and associated differentials with the second and third axle differential units respectively of an 8×8 vehicle and the close-coupled assembly may be termed "a through-drive axle". Frequently, the input shaft to the through-drive axle in has an axis perpendicular to and vertically displaced from the axle centerline. The drive is split in an inter-axle differential unit and the through-drive to the next axle is on the same axis as the input shaft. The drive to the local axle differential is transmitted through parallel axis gears to allow for the vertical displacement of the input shaft from the axle centerline. In an 8×8 vehicle with this drive line layout, the central torque transfer case and the front and rear torque transfer mechanisms and their associated differentials all lie between the second and third axles of the vehicle. This can cause a problem if it is desirable that the second and third axles be closely spaced or if, for example, space must be reserved for equipment such as a weapon turret. Also, because the through-drive from the second axle to the first or front axle is on an axis that is vertically displaced from the axle centerline, the propeller shaft between the axles is at an angle that may be excessive, particularly if the axles are closely spaced. Similarly, the propeller shaft angle between the third and fourth axles may be excessive.

The present invention is directed towards overcoming these problems.

BRIEF SUMMARY OF THE INVENTION

According to the invention, there is provided a driveline for a vehicle incorporating a through-drive axle unit which is a close-coupled assembly comprising a torque transfer mechanism with associated differential unit and an axle differential unit in which an output shaft of the through-drive is on substantially the same axis as an input pinion to the axle differential unit. Advantageously the present inventior provides a through-drive unit which has means for dropping the drive first and then splitting the drive. This is in contrast to conventional through-drive units which typically split the drive first and then drop a first drive to one axle and angulate a second drive via a propeller shaft with universal joints to another axle.

In one embodiment of the invention the through-drive axle unit has a drive input shaft, gearing for dropping the drive downwardly from the drive input shaft to the transfer mechanism differential unit for splitting the drive, said transfer mechanism differential unit having a first output driveably connected to the axle differential unit and a second output shaft for onward drive transmission.

In one embodiment of the invention the vehicle driveline includes:

a torque transfer mechanism with an associated first differential unit, said first differential unit having an input for connection to a drive means, said first differential unit having a first output and a second output, said first output being driveably connected to an output shaft for onward drive transmission, said second output being driveably connected through an input pinion to an axle differential unit, said output shaft and said input pinion being on substantially the same rotational axis.

In another embodiment, the invention provides a driveline for a vehicle incorporating an integrated transfer box and through-drive axle unit which is a close-coupled assembly including two torque transfer mechanisms with two associated differential units and an axle differential unit which are driveably interconnected.

In another embodiment the integrated transfer box and through-drive axle unit includes a drive input, means for dropping the drive, means for splitting the drive into a first drive output and a second drive output, the first drive output for onward drive transmission, means for dropping the second drive output means for splitting the second drive output into first and second outputs, the first output for onward drive transmission and the second output connecting to an axle differential unit. Preferably the means for dropping the drive comprises gearing.

In a further embodiment said integrated transfer box and through-drive axle unit includes:

a drive input shaft, the drive input shaft being driveably connected to a first differential unit, the first differential unit having a first output and a second output, the first output being driveably connected to a first output shaft for onward drive transmission, the second output being driveably connected to a second differential unit having a first output and a second output, the second differential unit first output being driveably connected to a second output shaft for onward drive transmission, the second differential unit second output being driveably connected to an axle differential unit having first and second drive outputs for connection to wheels of a vehicle.

In another embodiment the first output of the second differential unit is on substantially the same rotational axis as an input pinion to the axle differential unit.

In another embodiment the second output of the first differential unit is driveably connected to the second differential unit through a parallel axis gear pair.

In a further embodiment, said integrated transfer box and through-drive axle assembly includes first and second torque transfer mechanisms with their two associated differential units and an axle differential unit and is associated with a second axle from the front of the vehicle, takes its drive input from the vehicle engine via a main change-speed gearbox and a drop-box, has a first output from the first torque transfer mechanism towards the rear of the vehicle which drives the rear two axles through a through-drive axle unit located at a third axle from the front of the vehicle, has a second output from the first torque transfer mechanism towards the front of the vehicle which drives the front two axles through a second torque transfer mechanism which has one output close-coupled with an axle differential unit of the second axle and a second output towards the front of the vehicle to a propeller shaft which drives an input shaft of a front axle differential.

In another aspect, the invention provides a through drive axle unit for a vehicle driveline including:

a drive input shaft, the drive input shaft being drivably connected to a first differential unit, the first differential unit having a first output and a second output, the first output being drivably connected to an output shaft for onward drive transmission, the second output being drivably connected to an axle differential unit having first and second drive outputs for connection to wheels of a vehicle.

In a preferred embodiment, the output shaft is on substantially the same axis as an input pinion to the axle differential unit.

In a further aspect, the invention provides an integrated transfer box and through-drive axle unit for a vehicle driveline, including:

a drive input shaft, the drive input shaft being drivably connected to a first differential unit, the first differential unit having a first output and a second output, the first output being drivably connected to a first output shaft for onward drive transmission, the second output being drivably connected to a second differential unit, the second differential unit having a first output and a second output, the second differential unit first output being drivably connected to a second output shaft for onward drive transmission, the second differential unit-second output being drivably connected to an axle differential unit having first and second drive outputs for connection to wheels of a vehicle.

In a preferred embodiment, the first output of the second differential unit is on substantially the same axis as an input pinion to the axle differential unit.

In another embodiment, the second output of the first differential unit is drivably connected to the second differential unit through a parallel axis gear pair.

BRIEF DESCRIPTION OF THE DRAWINGS

The invention will be more clearly understood by the following description of some embodiments thereof, given by way of example only, with reference to the accompanying drawings, in which.

DETAILED DESCRIPTION OF THE INVENTION

Figure 1:
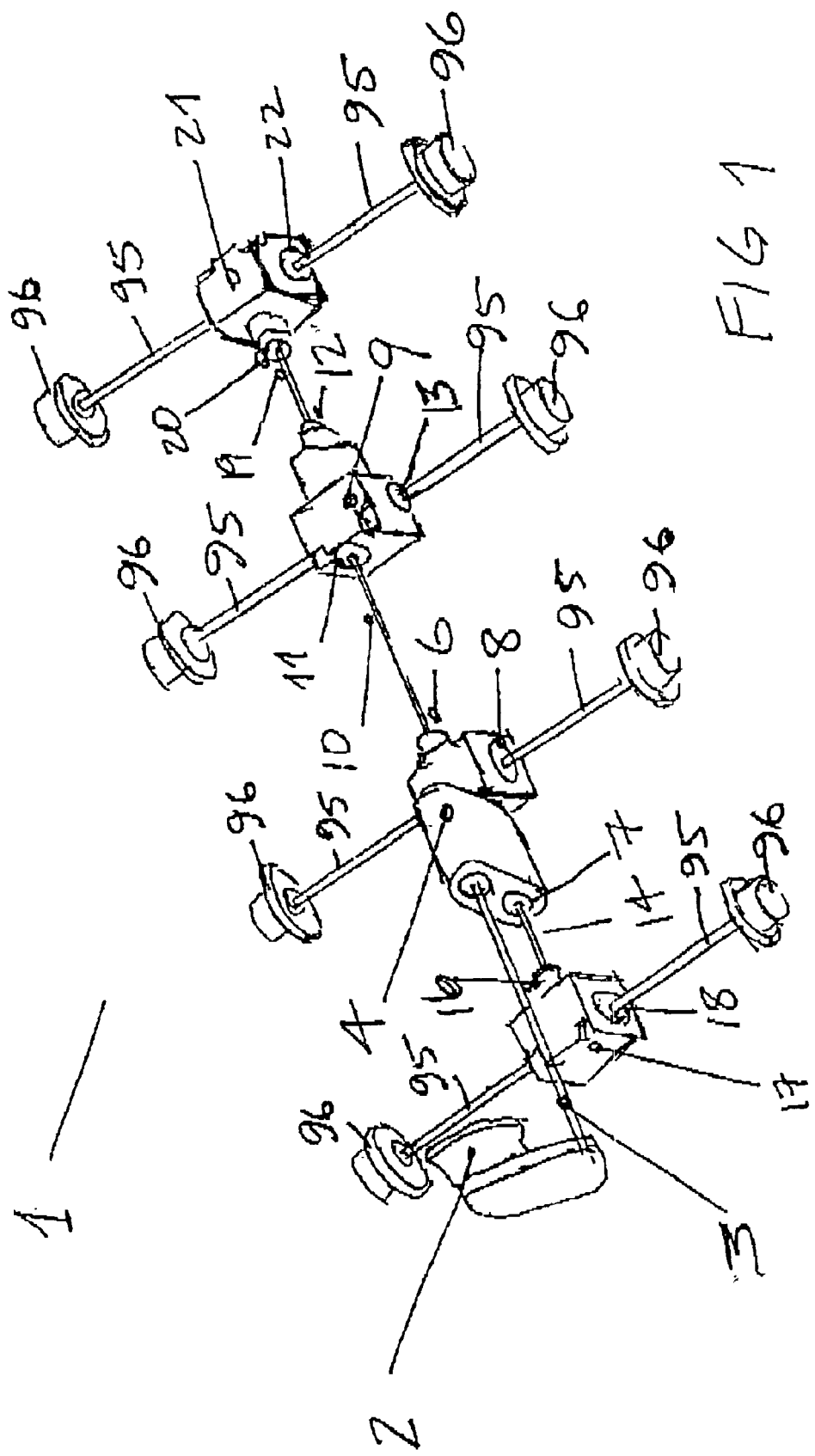
FIG. 1 is a schematic perspective view of an 8×8 vehicle drive line according to the invention illustrating the location of each major component.

Referring to the drawings, there is shown an 8×8 vehicle drive line according to the invention, indicated generally by the reference numeral 1. Drive from an engine and associated transmission gearbox (not shown) is delivered forward to a drop box 2. A propeller shaft 3 takes the drive from an output of the drop box 2 under the transmission gearbox and engine to an integrated transfer box and through-drive axle unit 4, which is illustrated in more detail in FIG. 2 and is located at the second axle position from a front of the vehicle. The integrated transfer box and through-drive axle unit 4 transmits a drive forwardly through a propeller shaft 14 to a front axle differential unit 17 and rearwardly through propeller shaft 10 to a through-drive axle unit 9. The through-drive axle unit 9 driveably connects by a propeller shaft 19 with a rear axle differential unit 21. Each axle unit 4, 9, 17, 21 connects through a pair of outwardly extending drive shafts 95 with wheel hubs 96 on which wheels (not shown) of the vehicle are mounted.

Figure 2:
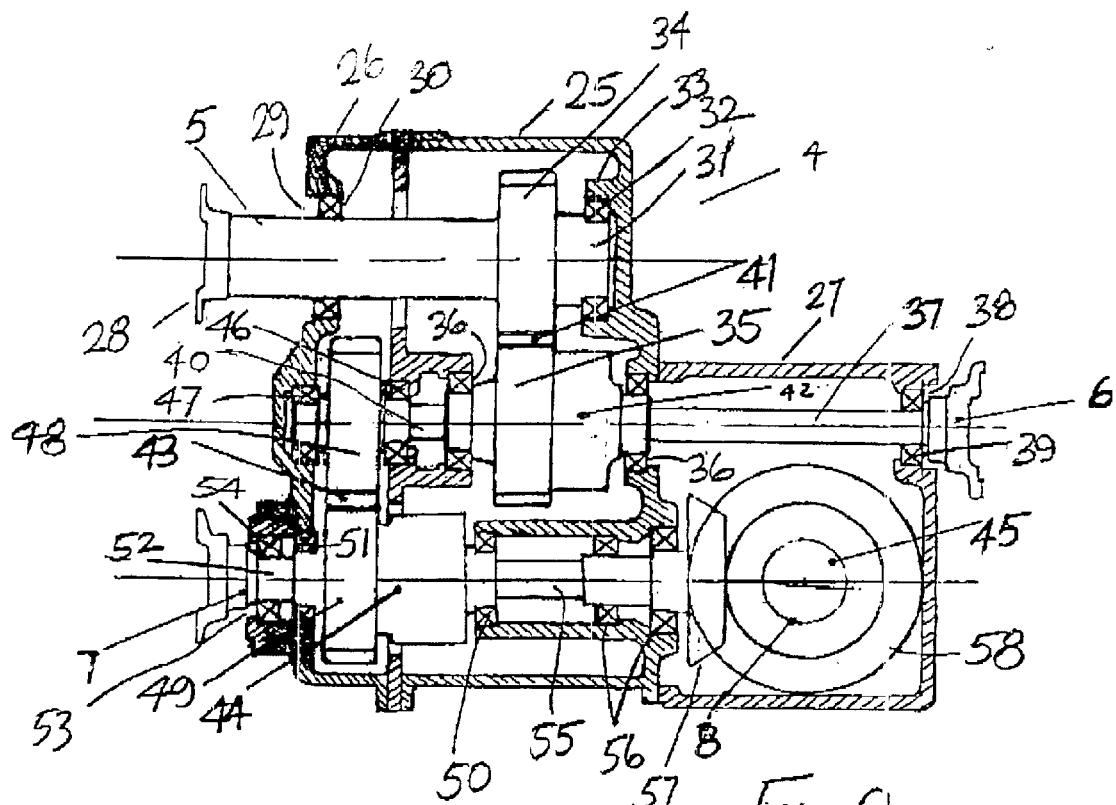
FIG. 2 is a sectional elevational view of an integrated transfer box and through-drive axle unit according to the invention.

FIG. 2 shows a cross-sectional view of the integrated transfer box and through-drive axle unit 4 in accordance with the invention. The drive from the drop box 2 comes in on an input flange and shaft 5 and is transferred by a parallel axis gear pair 41 to a first differential unit 42, which may be a standard differential, a limited slip differential, or any other suitable type of differential. A first output from the differential unit 42 provides a drive towards the rear of the vehicle through coupling flange 6. A second output from the differential unit 42 provides a drive towards the front of the vehicle through a parallel axis gear pair 43 to a second differential unit 44. A first output from the second differential unit 44 provides a drive towards the front of the vehicle through coupling flange 7 and a second output drives the axle differential unit 45, which has first and second outputs to coupling flanges 8 on each side of the unit 4.

Figure 3:
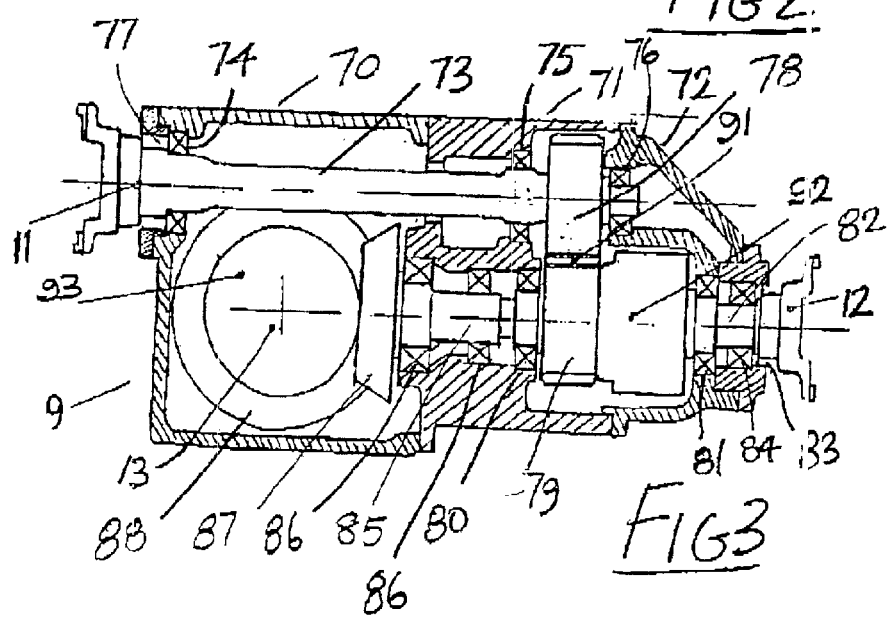
FIG. 3 is a sectional elevational view of a through-drive axle unit according to the invention.

Referring again to FIG. 1, a first output from the integrated transfer box and through-drive axle unit 4 through coupling flange 6 and propeller shaft 10, drives an input coupling flange 11 of a through-drive axle unit 9, which is illustrated in more detail in FIG. 3 and is located at a third axle position from the front of the vehicle.

FIG. 3 shows a cross-sectional view of a through-drive axle unit 9 in accordance with the invention. The drive comes in from the unit 4 on an input flange and shaft 11 and is transferred by a parallel axis gear pair 91 to a first differential unit 92, which may be a standard differential, a limited slip differential, or any other suitable type of differential. A first output from the differential unit 92 provides a drive towards the rear of the vehicle through coupling flange 12. A second output from the differential unit 92 drives an axle differential unit 93 which has first and second outputs to coupling flanges 13 on each side of the unit 9.

Referring again to FIG. 1, a second output from the integrated transfer box and through-drive axle unit 4 through coupling flange 7 and propeller shaft 14 drives an input coupling flange 16 of a first or front axle differential unit 17, which has drive output coupling flanges 18 on each side. A first output from the through-drive axle unit 9 through a coupling flange 12 and a propeller shaft 19 drives an input coupling flange 20 of a fourth or rear axle differential unit 21, which has output coupling flanges 22 on each side. Axle differential units drive the wheels at the front, second, third and rear axle positions through pairs of coupling flanges 18, 8, 13 and 22 respectively.

It will be appreciated that this arrangement allows a minimum spacing between the second and third axles and maximises the free space between these axles. Also, because coupling flanges 7 and 16 are axially aligned, the interconnecting propeller shaft 14 has no anglation, which allows a minimum spacing between the front and second axles. Similarly, the propeller shaft 19, between the third axle and the rear axle, is perfectly aligned.

In more detail, and referring in particular to FIG. 2 the integrated transfer box and through-drive axle unit 4 has a differential casing 25 with a cover 26 at one end. An opposite end of the casing 25 is connected to an axle housing 27. The drive input shaft 5 has a flange 28 for connection to the propeller shaft 3 which delivers drive from the engine and associated transmission gearbox. The drive input shaft 5 projects outwardly through an opening 29 in the cover 26. A bearing 30 mounted within the opening 29 rotatably supports the drive input shaft 5. An inner end 31 of the drive input shaft 5 is rotatably supported by a bearing 32 which is mounted in a bearing housing 33 within the casing 25. A first drive spur gear 34 is mounted or the drive input shaft 5 adjacent the inner end 31 of the drive input shaft 5. This first drive spur gear meshes with and drives a complementary first follower spur gear 35. This pair of spur gears 34, 35 forms the parallel axis gear pair 41 mentioned previously.

The first follower spur gear 35 is driveably connected to the differential unit 42 which is supported by bearings 36 in the casing 25. A first output shaft 37 of the differential unit 42 extends through the axle housing 27 passing closely over the axle differential and projects outwardly through an opening 38 in the axle housing 27. A bearing 39 located in the opening 38 rotatably supports the shaft 37. The coupling flange 6 is mounted at an outer end of the shaft 37 for connection to the propeller shaft 10 for onward drive transmission. A second output shaft 40 of the differential unit 42 is supported by bearings 46, 47 on the casing 25 and associated cover 26 respectively. A second drive spur gear 48 is mounted on the shaft 40 and meshes with a complementary second follower spur gear 49. Both these spur gears 48, 49 form the parallel axis gear pair 43 mentioned previously.

The second differential unit 44 is supported by bearings 50, 51 on the casing 25 and cover 26 respectively. The second differential unit 44 has a first output shaft 52 which projects outwardly though an opening 53 in the cover 26. A bearing 54 rotatably supports the shaft 52 in the opening 53. The coupling flange 7 is mounted at an outer end of the shaft 52 for connection to the propeller shaft 14. A second output of the second differential unit 44 is delivered to the axle differential unit 45 through a pinion shaft 55 which is supported by bearings 56 on the casing 25. The pinion 57 at an outer end of the pinion shaft 55 driveably engages a crown wheel 58 of the axle differential unit 45.

Referring now to FIG. 3 the through-drive axle unit 9 will be described in more detail. The unit 9 has an axle housing 70 at one end of which is mounted a differential casing 71 with a cover 72. A drive input shaft 73 is supported by bearings 74, 75, 76 on the axle housing 70, differential casing 71 and cover 72 respectively. The coupling flange 11 for connection to the propeller shaft 10 is mounted at an outer end of the drive input shaft 73 which projects outwardly through an opening 77 in the axle housing 70. The bearing 74 is mounted in this opening 77. It will be noted that the drive input shaft 73 passes closely over the axle differential unit 93. At an inner end of the drive input shaft 73 a drive spur gear 78 is mounted. This drive spur gear 78 is meshed with and drives a follower spur gear 79. This pair of spur gears 78, 79 together form the parallel axis gear pair 91 mentioned previously. The follower spur gear 79 is connected to the differential unit 92 which is supported by bearings 80, 81 on the casing 71 and cover 72. The differential unit 92 has an output shaft 82 which projects outwardly through an opening 83 in the cover 72. A bearing 84 mounted in the opening 83 rotatably supports the shaft 82. The coupling flange 12 is mounted at an outer end of the shaft 82 for connection to the propeller shaft 19. A second output of the differential 92 is delivered through a pinion shaft 85 which is rotatable supported on the casing 71 by bearings 86. A pinion 87 driveably engages a crown wheel 88 of the axle differential unit 93.

It will be appreciated that the embodiment of the invention described above is suitable for use in an 8×8 vehicle drive line. It will be understood that the through-drive axle unit 9 may be associated with an axle other than the third axle as illustrated and that the integrated transfer box and through-drive axle unit 4 may be associated with an axle other than the second axle as illustrated. For example the driveline described above may be reversed with the engine being located at a rear of the vehicle.

It will further be appreciated that the present invention mitigates the problems associated with the prior art by close coupling two of the torque transfer mechanisms with one axle differential unit without any intervening propeller shafts and close coupling the remaining torque transfer mechanism with another axle differential unit. The invention minimises the number of drive shafts and allows for good alignment of the drive shafts and a compact layout of the driveline. It can also be usefully employed in vehicles with three, five or more driven axles.

The invention is not limited to the embodiments hereinbefore described which may be varied in both construction and detail within the scope of the appended claims.

What is claimed is:

1. A driveline for a vehicle incorporating a through-drive axle unit which is a close-coupled assembly comprising:

a housing, a torque transfer mechanism with an associated first differential unit of the through-drive axle unit mounted within the housing, said first differential unit of the through-drive axle unit having an input which projects outwardly of the housing for connection to a drive means, said first differential unit of the through-drive axle unit having a first output and a second output, said first output being driveably connected to an output shaft which projects outwardly of the housing for onward drive transmission, said second output being driveably connected through an input pinion to an axle differential unit within the housing, said output shaft and said input pinion being on substantially the same rotational axis.

2. The vehicle driveline as claimed in claim 1, wherein the driveline incorporates an integrated transfer box and through-drive axle unit which is a close-coupled assembly including two torque transfer mechanisms with two associated differential units and an axle differential unit which are driveably interconnected.

3. The vehicle driveline as claimed in claim 2, wherein said integrated transfer box and through-drive axle unit includes:

a drive input shaft, the drive input shaft being driveably connected to the first differential unit of the integrated transfer box and through drive axle unit, the first differential unit of the integrated transfer box and through-drive axle unit having a first output and a second output, the first output being driveably connected to a first output shaft for onward drive transmission, the second output being driveably connected to a second differential unit having a first output and a second output, the second differential unit first output being driveably connected to a second output shaft for onward drive transmission, the second differential unit second output being driveably connected to an axle differential unit having first and second drive outputs for connection to wheels of a vehicle.

4. The vehicle driveline as claimed in claim 3, wherein the first output of the second differential unit is on substantially the same rotational axis as an input pinion to the axle differential unit.

5. The vehicle driveline as claimed in claim 3, wherein the second output of the first differential unit is driveably connected to the second differential unit through a parallel axis gear pair.

6. The vehicle driveline as claimed in claim 2, wherein said integrated transfer box and through-drive axle assembly includes first and second torque transfer mechanisms with their two associated differential units and an axle differential unit and is associated with a second axle from the front of the vehicle and takes its drive input from the vehicle engine via a main change-speed gear box and a drop-box, and has a first output from the first torque transfer mechanism towards the rear of the vehicle which drives the rear two axles through a through-drive axle unit located at a third axle from the front of the vehicle, and has a second output from the first torque transfer mechanism towards the front of the vehicle which drives the two front axles through a second torque transfer mechanism which has one output close-coupled with an axle differential unit of the second axle and a second output towards the front of the vehicle connected to a propeller shaft which drives an input shaft of a front axle differential.

7. A vehicle driveline through-drive axle units including:

a housing, a drive input shaft mounted within the housing and projecting outwardly of the housing for connection to a drive means, the drive input shaft being driveably connected to a first differential unit of the through-drive axle unit mounted within the housing, the first differential unit of the through-drive axle unit having a first output and a second output, the first output being driveably connected to an output shaft which projects outwardly of the housing for onward drive transmission, the second output being driveably connected through an input pinion to an axle differential unit within the housing having first and second drive outputs which project outwardly of the housing for connection to wheels of a vehicle, the output shaft for onward drive transmission being on substantially the same rotational axis as the input pinion to the axle differential unit.

8. An integrated transfer box and through-drive unit for a vehicle driveline, including:

a casing, a drive input shaft mounted within the casing and projecting outwardly of the casing for connection to a drive means, the drive input shaft being driveably connected to a first differential unit of the integrated transfer box and through-drive unit, the first differential unit of the integrated transfer box and through-drive unit having a first output and a second output, the first output being driveably connected to a first output shaft which projects outwardly of the casing for onward drive transmission, the second output being driveably connected to a second differential unit mounted within the casing having a first output and a second output, the second differential unit first output being driveably connected to a second output shaft which projects outwardly of the casing for onward drive transmission, the second differential unit second output being driveably connected to an axle differential unit mounted within the casing and having first and second drive outputs which project outwardly of the casing for connection to wheels of a vehicle.

9. The integrated transfer box and through-drive unit for a vehicle driveline as claimed in claim 8, wherein the first output of the second differential unit is on substantially the same rotational axis as an input pinion to the axle differential unit.

10. The integrated transfer box and through-drive unit for a vehicle driveline as claimed in claim 8, wherein the second output of the first differential unit is driveably connected to the second differential unit through a parallel axis gear pair.

* * * * *